United States Patent [19]

DeFrees

[11] 4,453,698
[45] Jun. 12, 1984

[54] STUFFING BOX WITH O-RING DETENT FOR CONTROL MECHANISM OF EMERGENCY VALVE

[75] Inventor: Joseph H. DeFrees, Warren, Pa.

[73] Assignee: Allegheny Valve Company, Warren, Pa.

[21] Appl. No.: 373,098

[22] Filed: Apr. 29, 1982

[51] Int. Cl.³ .................................................. F16K 51/00
[52] U.S. Cl. ........................................ 251/144; 251/241;
251/DIG. 1; 137/329; 277/29; 277/167.5;
277/177; 277/DIG. 8
[58] Field of Search .................... 277/217, 29, DIG. 8,
277/167.5, 177, 19; 251/DIG. 1, 241, 144;
137/315, 329

[56] References Cited

U.S. PATENT DOCUMENTS

| | | | |
|---|---|---|---|
| 2,525,928 | 10/1950 | McRoe | 251/284 |
| 2,713,989 | 7/1955 | Bryant | 251/DIG. 1 |
| 3,082,785 | 3/1963 | Radway | 137/386 |
| 3,259,392 | 7/1966 | Peickii et al. | 277/177 |
| 3,889,923 | 6/1975 | Saville et al. | 251/170 |
| 4,171,711 | 10/1979 | Bake et al. | 137/312 |

FOREIGN PATENT DOCUMENTS

684134  4/1964 Canada .

Primary Examiner—A. Michael Chambers
Attorney, Agent, or Firm—Baldwin, Egan, Walling & Fetzer

[57] ABSTRACT

A stuffing box for use in a control for an emergency valve for controlling discharge from a liquid storage tank, such as a gasoline storage tank, with the tank having an outlet port with a conduit member coacting with the port in depending relation therefrom. The stuffing box is adapted to be mounted on the conduit member and to extend from the interior to the exterior thereof. The stuffing box comprises a barrel member defining a passageway open at opposite ends. A crank including a shaft rotatably disposed in the passageway of the barrel member is mounted on the barrel member. Sealing means coacts between the shaft and the barrel member for sealing the shaft against leakage of liquid from the conduit lengthwise of the barrel member, and a releasable non-threaded detent is disposed generally adjacent the exterior end of the barrel member for locating and maintaining the shaft relative to the barrel member lengthwise thereof. The arrangement is such that the stuffing box is resistant to corrosion and freezing-up, and is adapted to provide long service life to the control for operating the emergency valve, while providing for expeditious replacement of the seals thereof.

10 Claims, 11 Drawing Figures

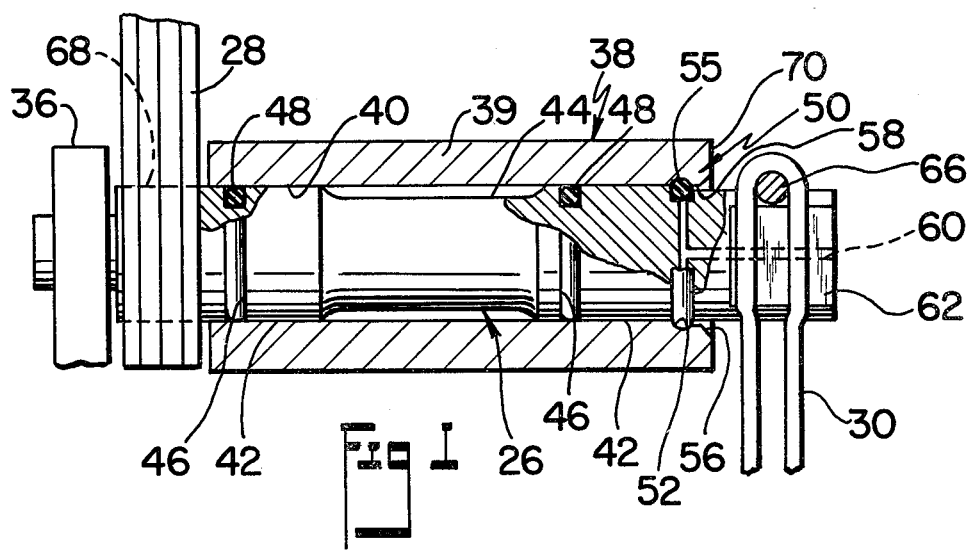
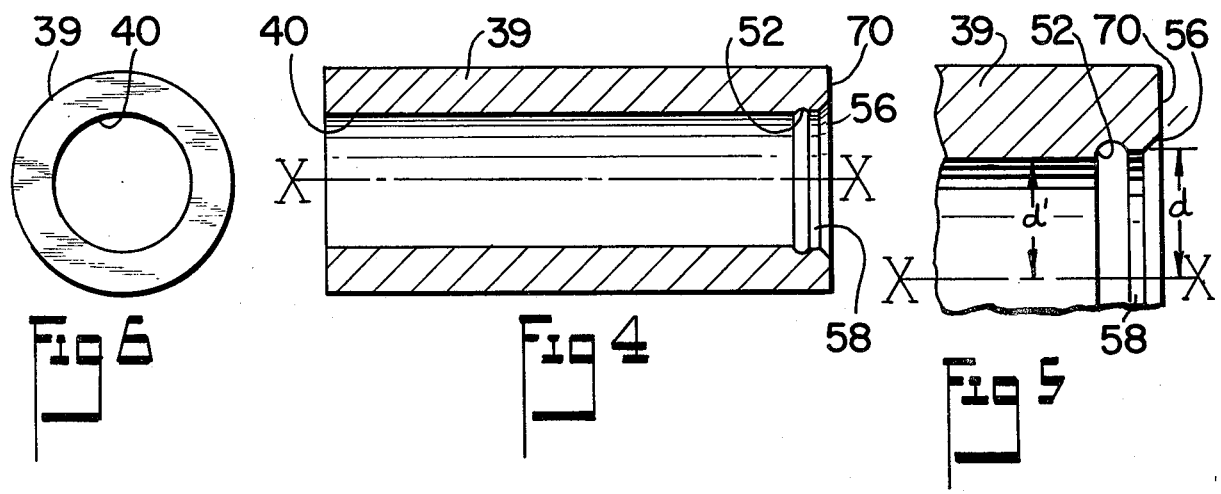
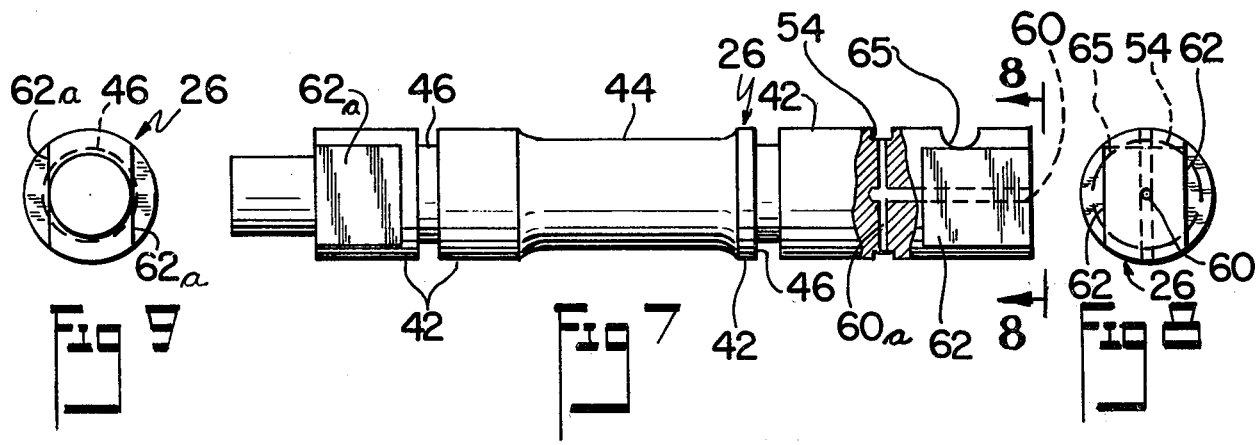

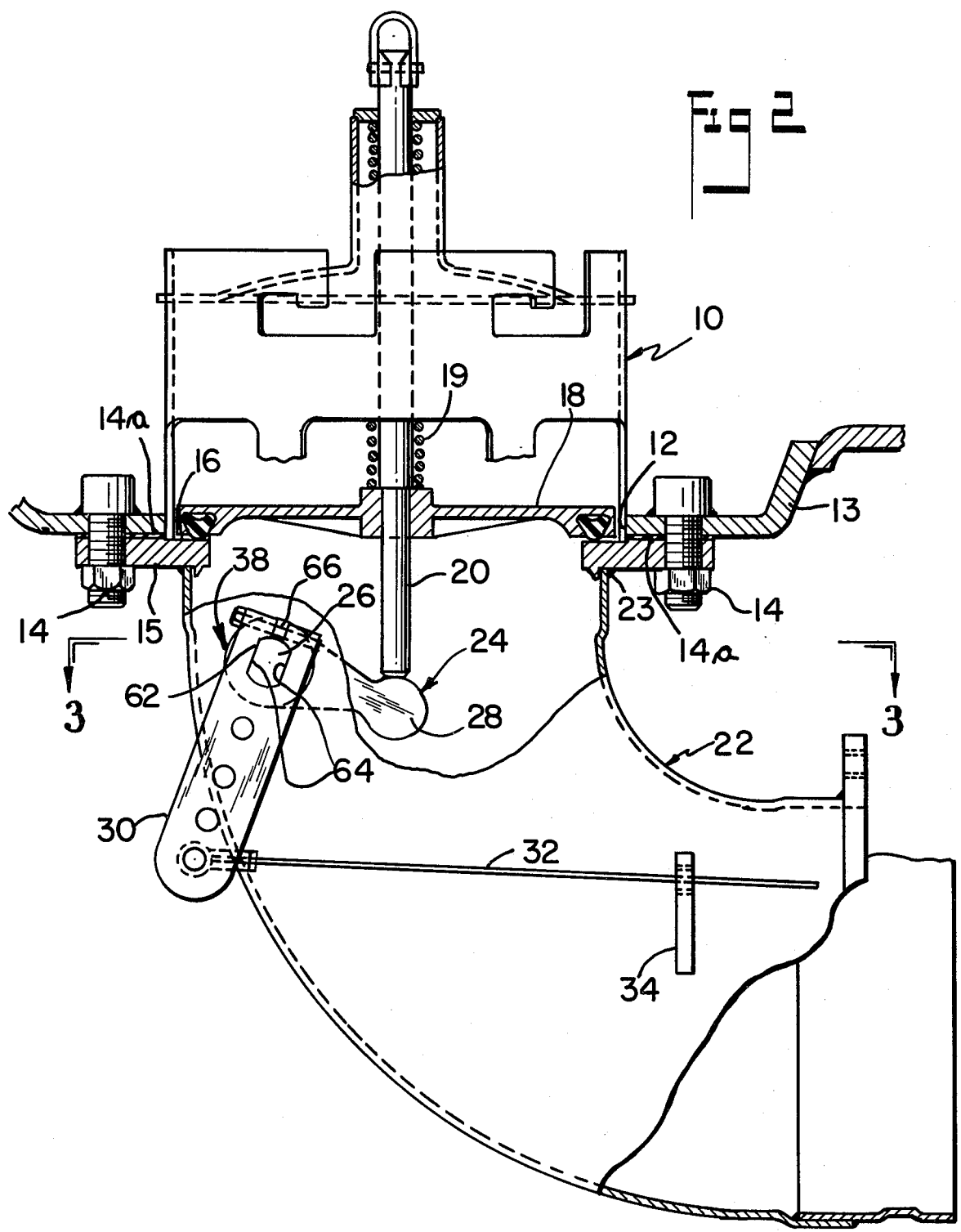

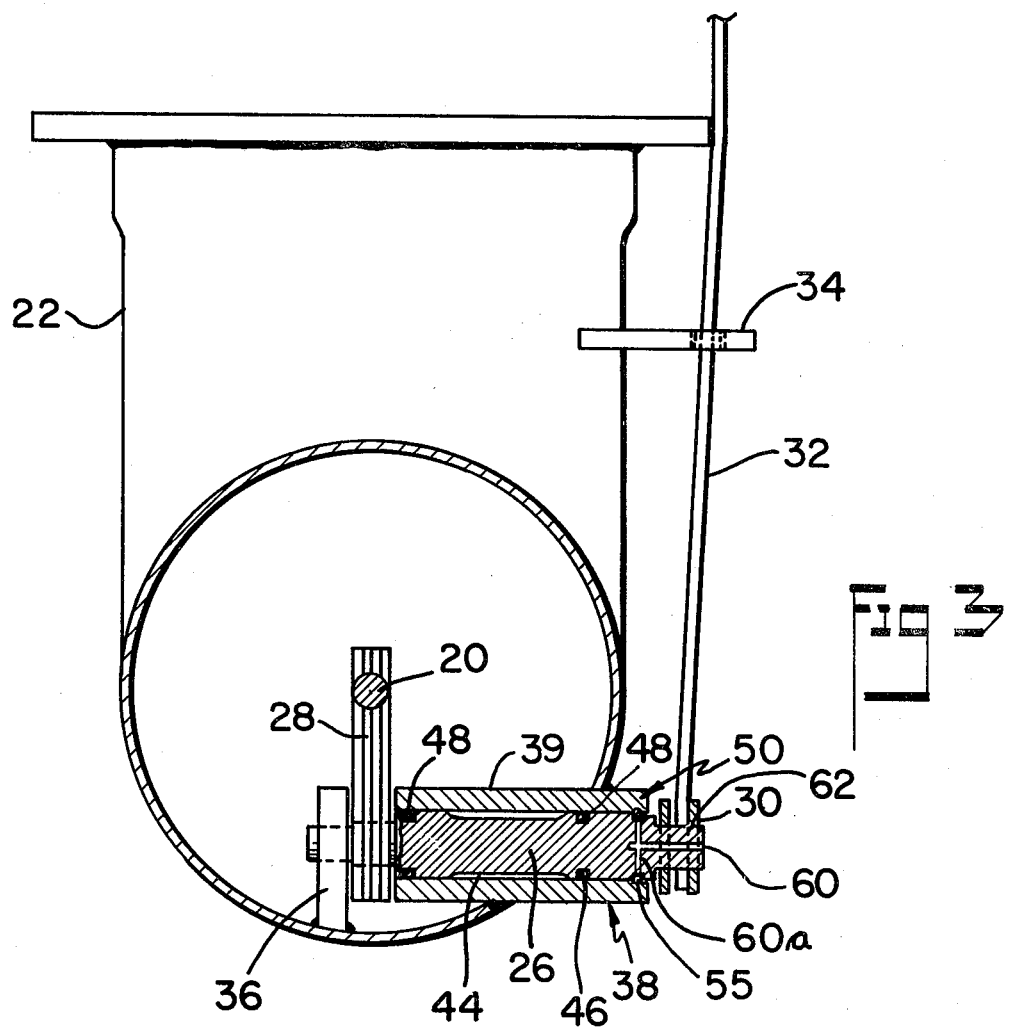

STUFFING BOX WITH O-RING DETENT FOR CONTROL MECHANISM OF EMERGENCY VALVE

SPECIFICATION

This invention relates in general to a stuffing box for mounting a crank for operation of an emergency valve on a gasoline or other liquid containing storage tank, and more particularly a stuffing box which is more resistant to corrosion and freezing-up of the parts thereof, and yet one which will effectively seal the egress of liquid along the crank, from interiorly of the conduit member conventionally associated with the tank's exit port.

BACKGROUND OF THE INVENTION

It is well known in the art to utilize a stuffing box in conjunction with a crank for operating an emergency valve of a gasoline transport tank. Applicant's Canadian Patent No. 684,134 dated Aug. 14, 1964 illustrates a stuffing box arrangement embodying spring loaded packing, and is utilized to seal and prevent the leakage of fluid along the crank shaft of the valve operating means, and from interiorly of a conduit member coacting with the exit port of the tank. Ordinarily a threaded cap is utilized for closing the stuffing box and applying the bias of the associated spring to the packing of the stuffing box. Such mechanism is usually subjected to substantial corrosion due to road salt and moisture, etc. and many times the parts of the stuffing box, including the threaded cap thereof, freeze up. If it becomes necessary to repair or replace the packing in the stuffing box, and/or the valve operating means, it may be quite difficult and at times impossible to disassemble the stuffing box by unscrewing the cap thereof. This may necessitate a complete replacement of the conduit member and attached stuffing box and valve operating assembly.

SUMMARY OF THE INVENTION

The present invention provides a stuffing box for use with an emergency valve operating means of a gasoline transport tank or the like, which is simplified yet highly effective in preventing leakage of liquid along the crank shaft of the valve operating mechanism, and which provides a highly effective arrangement for locating the crank shaft lengthwise relative to the barrel of the stuffing box, but which can be relatively readily disassembled for replacement of seals and/or other parts of the valve operating mechanism, if that becomes necessary or desirable.

Accordingly, an object of the invention is to provide a novel stuffing box arrangement for use with a valve operating mechanism of the emergency valve of a gasoline transport tank or the like, and one wherein freezing-up of the parts due to corrosion or the like is obviated.

Another object of the invention is to provide a stuffing box of the latter type which includes a non-threaded detent means adjacent an exterior end of the barrel member of the box, for locating the shaft relative to the barrel member lengthwise thereof, and for aiding in sealing the shaft and stuffing box against the entry of foreign material thereinto.

Another object of the invention is to provide a stuffing box of the above type, which includes means which in combination with the crank shaft for operating the emergency valve of a gasoline transport tank, includes means for lubricating the shaft relative to the barrel.

A still further object of the invention is to provide a stuffing box of the above type which includes means on the crank shaft, opening to the exterior thereof, for aiding in exhausting air from the detent structure groove in the crank shaft, during assembly of the crank shaft with the barrel member.

A still further object of the invention is to provide a stuffing box of the aforementioned type wherein the detent arrangement provides for relatively rapid assembly or disassembly of the crank shaft with respect to the barrel member of the stuffing box.

A still further object of the invention is to provide a stuffing box of the above type in conjunction with the valve operating mechanism of an emergency valve for a liquid retaining tank, such as a gasoline transport tank, for expeditiously mounting the valve operating mechanism on the conventional conduit member coacting with the outlet port of the tank, and in a manner wherein the crank shaft of the valve operating mechanism is effectively located in position to operate the emergency valve, and yet is of such structure that it is not readily subjected to corrosion.

Other objects and advantages will be apparent from the following description taken in connection with the accompanying drawings wherein:

BRIEF DESCRIPTION OF THE DRAWINGS

FIG. 1 is a partially broken and sectioned elevational view of the stuffing box and associated valve operating mechanism, including the crank shaft thereof, and embodying the detent means for locating the shaft lengthwise relative to the barrel member of the stuffing box.

FIG. 2 is a partially broken and sectioned view illustrating the stuffing box of the invention as mounted on the conduit member conventionally associated with the discharge port of a liquid storage tank.

FIG. 3 is a partially sectioned view of the conduit member and valve operating mechanism of FIG. 2 taken generally along the plane of line 3—3 of FIG. 2, looking in the direction of the arrows.

FIG. 4 is a longitudinally sectioned view of the barrel member per se of the stuffing box.

FIG. 5 is a fragmentary, enlarged illustration of the outer end of the barrel member which includes the detent recess arrangement, for locating and maintaining the position of the crank shaft in a direction lengthwise of the stuffing box.

FIG. 6 is an end elevational view of the barrel member of FIG. 4 taken from the left hand end thereof.

FIG. 7 is an elevational view of the crank shaft member of the valve operating mechanism, and is partially broken to better illustrate the passageways therein, for exhausting air from the detent chamber of the stuffing box to facilitate entry of the O-ring detent into the barrel during assembly of the shaft into the barrel member.

FIG. 8 is an end view of the crank shaft taken generally along the plane of line 8—8 of FIG. 7 looking in the direction of the arrows.

FIG. 9 is an end elevational view of the other end of the shaft of FIG. 7.

DESCRIPTION OF PREFERRED EMBODIMENT

Figure 10:
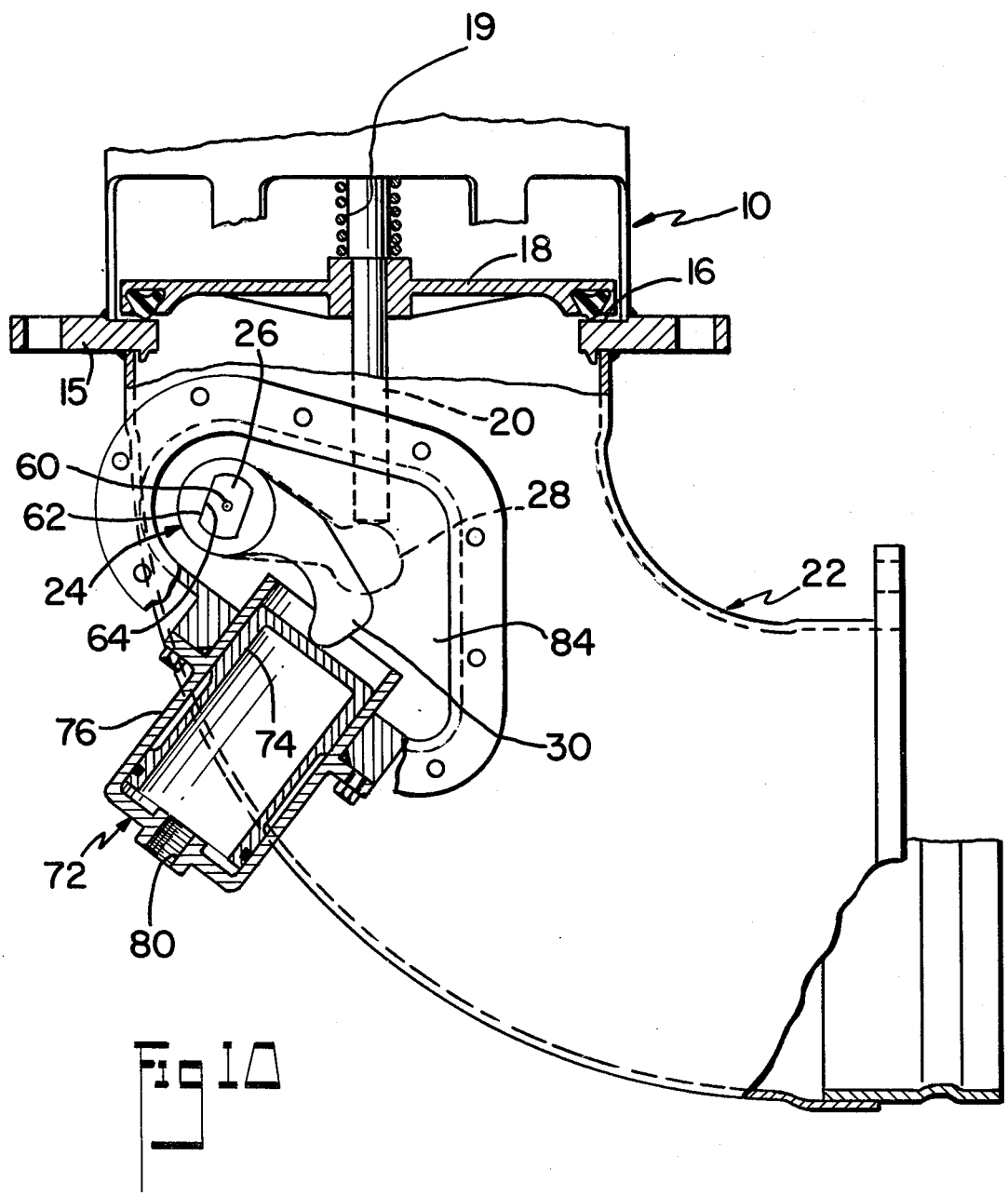
FIG. 10 is a partially broken and sectioned elevational view of an emergency valve in combination with an air-operated reciprocal motor unit, for actuating the crank shaft of the valve operating means, and utilizing the stuffing box of the instant invention therewith.

Referring now to FIGS. 1–9, there is shown in FIG. 2 an emergency valve 10, various types of which are known in the art, associated with an outlet port 12 formed in the bottom wall 13 of a liquid storage tank, such as for instance, a tank truck or trailer used for transportation of various types of liquids, such as for instance, gasoline, chemicals, oils or the like. The emergency valve may be secured to the tank bottom wall at the outlet port 12 by any suitable means, such as for instance, by fasteners 14, and sealing means 14a may be provided, coacting between the valve plate 15 and the tank, to prevent leakage of the tank contents about the valve.

The valve may include a valve seat 16 on plate 15, and a movable valve head 18 which is spring loaded as at 19 which is biased toward closed position as illustrated in FIG. 2. Thus the emergency valve is normally disposed in closed position, thus preventing egress of liquid from the tank past the valve head 18.

The valve head may conventionally include a depending stem or projecting portion 20 which extends downwardly into the conduit member 22, the latter being secured as by means of welds 23 to the underside of the valve plate 15. Upward movement of stem or projecting portion 20 and attached valve head 18 against resistance to compression of the spring 19 will cause opening of the valve, thereby permitting liquid to drain by gravity into the conduit member 22, which in the embodiment illustrated is an elbow of generally conventional well-known type.

Valve actuating mechanism 24 is provided for selectively actuating the emergency valve to open the same, and thus permit liquid in the tank to drain from the tank past the valve and into the conduit member 22 (or vice versa), from whence it is adapted to be transported by another location for further handling.

Such valve actuating mechanism comprises a crank which includes a generally horizontally arranged shaft 26 to which adjacent one end thereof is affixed a preferably removable operating head 28, which normally engages the depending stem portion 20 on the emergency valve (FIG. 2). The other end of shaft 26 may be provided with an operating lever 30 preferably detachably secured thereto. In the FIGS. 2–3 illustration, a control line or cable 32 is attached to the lever 30, and which cable may pass through apertured lug 34 (FIG. 2) on the exterior side of conduit member 22, for placing a pulling force on the lever, thus causing rotation of the shaft 26 and a resultant upward swinging movement of the operating head 28 of the valve actuating mechanism. Control line 32 my be manually operated from a remote location, such as for instance, from a lever (not shown) mounted on the vehicle transport on which the storage tank is mounted.

As can be best seen in FIGS. 2 and 3, the crank including the crank shaft 26, extends from interiorly of the conduit member 22 to the exterior thereof, through the wall of the conduit member. The interior end of the shaft 26 may be rotatably mounted in a lug 36 attached to the interior of conduit 22, for rotatably supporting such interior end of the crank shaft 26.

The stuffing box 38 includes a barrel member 39 which is open at opposite ends thereof, and defines a circular (in cross section) passageway 40 through the barrel member. As can be best seen in FIG. 3, barrel member 39 is secured to conduit member 22 as by means of welds, and extends from interiorly of the conduit member to the exterior thereof through an opening in the defining wall of the conduit member. The shaft 26 has spaced bearing portions 42 thereon, for rotatably mounting the crank shaft on the barrel member 39 of the stuffing box 38. Intermediate bearing portions 42, there is provided a recessed portion 44 on the shaft adapted for receiving a lubricant, such as a petroleum grease, for lubricating the shaft relative to the barrel 39. The shaft 26 is also provided with circumferential grooves 46 therein and in which are disposed a sealing means, such as rubber O-rings 48, for sealing the shaft and barrel 39 of the stuffing box against the leakage of liquid lengthwise of the stuffing box from interiorly of the conduit member 22 to the exterior end thereof.

In accordance with the invention there is provided releasable, non-threaded detent means 50 adjacent the exterior end of the barrel member of the stuffing box, for locating and releasably maintaining the shaft's position 26 relative to the barrel member lengthwise thereof. Such non-threaded detent means also helps to insure that corrosion will not prevent disassembly of the shaft from the stuffing box if that becomes desirable or necessary in order to replace the seals 48 on the crank shaft 26. Moreover, such a non-threaded detent arrangement is relatively simple to manufacture as compared to prior arrangements, and results in reduced costs for the stuffing box arrangement.

The detent means 50 comprises a circumferential semi-circular-like in cross section groove 52 in the passageway 40 of the barrel member, generally adjacent the exterior end of the barrel member, and a generally confronting complementary groove 54 of preferably rectangular-like cross section provided in the shaft 26. A resilient O-ring 55 is disposed in the confronting grooves 52 and 54, and releasably locks or maintains the shaft in lengthwise position relative to the barrel member. Such O-ring detent 55 also seals the exterior end of the stuffing box from entry of foreign material, such as salt or other material which might corrode the bearing areas on the shaft and/or the defining passageway surface through barrel member 39. O-ring 55 is preferably formed of "Buna N" or of "Viton" (for more severe service) and preferably is of a durometer of approximately 65.

Referring now in particular to FIGS. 4 and 5, it will be seen that the barrel member 39 on its exterior end includes a circumferentially extending convergent entry surface 56 to passageway 40 in the barrel member, for facilitating the entry of detent O-ring 55 as assembled on shaft 26 into received coaction with the confronting groove 52, in the barrel member 39. Entry surface 56 merges into generally longitudinally extending circumferential passageway surface 58 which is spaced radially a slightly greater distance d from the lengthwise axis x—x (FIG. 5) of the passageway 40 through the barrel member, as compared to the spacing distance d' of the remainder of the longitudinally extending, defining surface of the passageway. As for example d may be of the order of 0.473 inches while d' may be of the order of 0.4385 inches.

Barrel member 39 of the stuffing box, and shaft 26 of the crank of the valve actuating mechanism, may be formed of any suitable materials, and preferably are formed of the same material, so as to eliminate any possibility of electrolytic action between the parts. A suitable material (and one that has considerable corrosion resistance) is aluminum.

The exterior end of the shaft 26 is preferably provided with an axial passageway or entranceway 60 therein which communicates with crossway passageway 60a which in turn opens at its ends into the detent groove 54. Passageways 60, 60a are provided for the exhaustion of air from the detent chamber defined by confronting grooves 52, 54 during assembly of the shaft 26 and mounted detent 55 axially into the barrel member 39, thus aiding in the movement of shaft mounted detent 55 into the receiving groove 52.

The exterior end of the shaft 26 also may be provided with flats 62 for coaction with the complementary surfaces 64 of the receiving opening in the crank lever 30, and a groove 65 may likewise be provided in the shaft which receives therethrough a pin or fastener 66 on actuating lever 30, for removably locking the lever to the shaft. The other end of the shaft may likewise be provided with flats 62a for snug frictional coaction with the defining surface of opening 68 through operating head or cam 28.

Removal of the shaft 26 from the stuffing box can be accomplished by inserting a pry bar, such as a screw driver, between the lever 30 and the confronting face 70 of the barrel member 39 of the stuffing box, and then prying outwardly until the resilient detent O-ring 55 is forced out of the coacting groove 52 in the barrel. Such prying force also moves the shaft out of coaction with the operating cam 28. The shaft can then be moved lengthwise out of the stuffing box barrel housing 39. Upon assembly of the shaft back into the barrel (after replacement of the seals 48 if that is desirable or necessary) the groove 44 is preferably refilled with fresh lubricant (e.g. petroleum grease) which lubricates rotary movement of the shaft relative to the barrel as well as aiding in lubricating the O-ring seals 48. Axial assembly of the shaft into the barrel of the stuffing box continues until the detent O-ring 55 snaps into the detent groove 52 in the barrel member, thus locking and positioning the shaft in proper position lengthwise of the barrel. It will be seen that the sloping entry surface 56 (which preferably is at an angle of approximately 45°) and the increased diameter longitudinal surface 58, facilitates this forced entry of the detent O-ring 55 into the detent groove 52 in the barrel.

Figure 11:
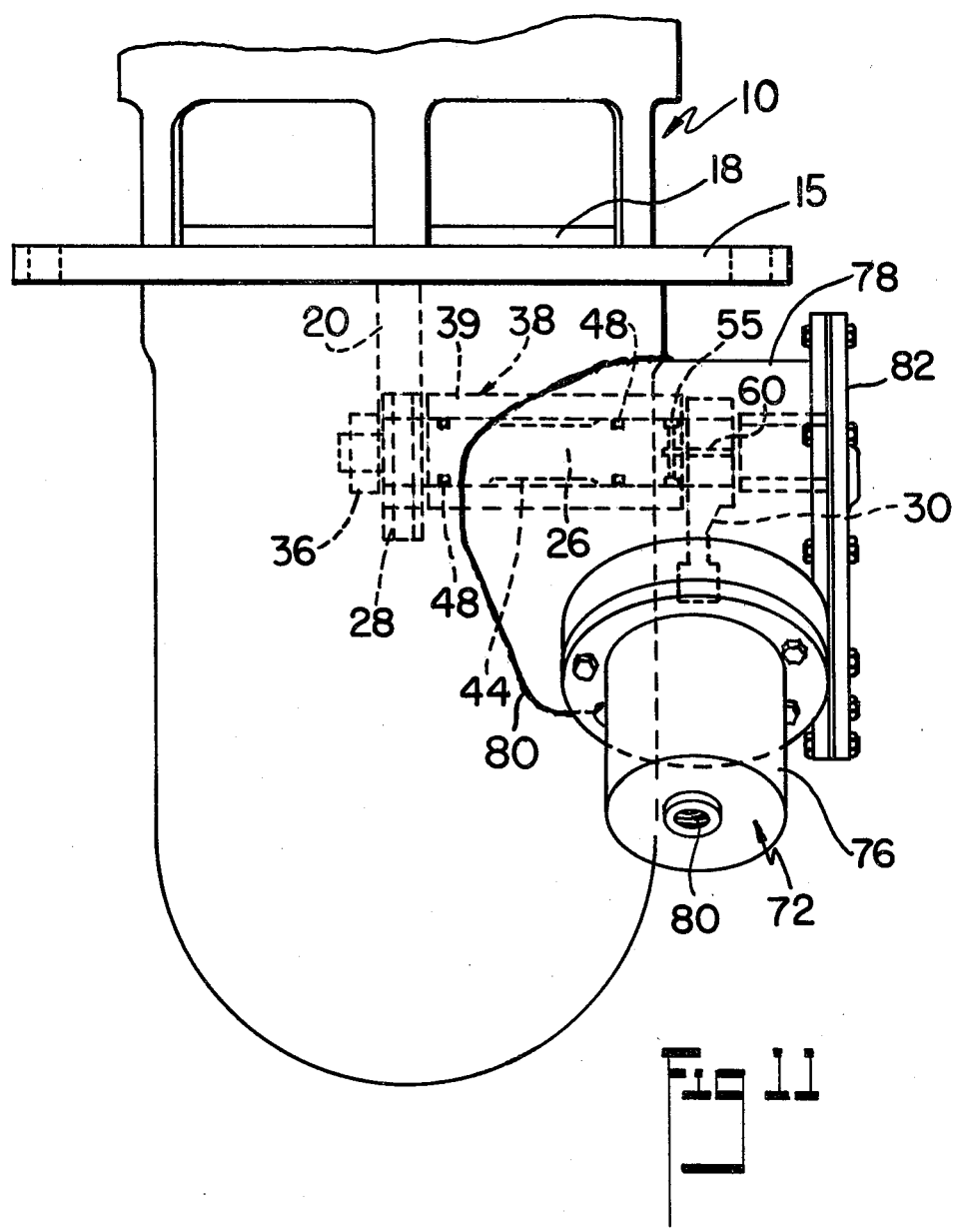
FIG. 11 is a rear elevational view of the FIG. 10 arrangement, and showing the stuffing box of the invention mounted on the conduit member, and extending from interiorly of the conduit member to the exterior thereof within an associated crankcase.

Referring now to FIGS. 10 and 11, there is illustrated another arrangement of emergency valve actuating means as compared to the first described embodiment. In this embodiment the valve actuating mechanism is operated by a fluid powered reciprocal motor unit 72, including a piston 74 and a cylinder 76, mounted on a crank case 78, secured as by welds 80 to the side of conduit member 22.

The operating lever 30 of the valve actuating crank 24, is disposed in the crank case 78, with the piston 74 of the motor unit being adapted to engage lever 30 and upon inward movement of the piston due to the application of pressurized fluid (e.g. air) via opening 80 in the cylinder of the motor unit 72, the crank is rotated, causing upward swinging movement of operating head or cam 28, and thus raising the valve closure 18 above the valve seat 16 to permit gravity flow of liquid from the tank 13.

Crank case 78 is preferably provided with a removable access cover 82, and a stuffing box 38 of the aforedescribed type is mounted on the conduit member 22, extending from interiorly thereof to the exterior and into the crank case chamber 84. Chamber 84 preferably contains a quantity of liquid lubricant therein.

From the foregoing discussion and accompanying drawings, it will be seen that the invention provides a stuffing box adapted for use in a control mechanism which includes a rotatable crank shaft for an emergency valve of a liquid storage tank, such as a gasoline transport tank, and wherein the stuffing box includes a readily releasable non-threaded detent means for locating the crank shaft relative to the stuffing box housing, lengthwise thereof, resulting in a stuffing box arrangement that possesses high corrosion resistance, and is able to be expeditiously disassembled for replacement of the sealing means of the stuffing box. The invention also provides a stuffing box which effectively mounts the crank shaft of the valve actuating mechanism for the emergency valve thereon, in rotatable relation, and in a manner which expeditiously prevents leakage of liquid from the conduit member associated with the emergency valve, lengthwise along the crank shaft.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a liquid discharge control means for a liquid storage tank having an outlet port with a conduit member for liquid coacting with said port in depending relation therewith, an emergency valve operatively associated with said port and being normally biased to closed position wherein discharge from said tank into said conduit member is normally prevented, said emergency valve including a projection extending downwardly into said conduit member, and a crank including a rotatable shaft, said crank being adapted to engage said projection of said emergency valve, and open the latter, to thereby permit liquid discharge from said tank, said shaft passing through the defining wall of said conduit member to the exterior thereof, and adapted for connection to means for causing rotation of said shaft to thus cause actuation of said crank and opening of said emergency valve, the combination therewith of a stuffing box mounted on said conduit member and coacting with said shaft for supporting said shaft in operative position and for preventing leakage of liquid from the interior of said conduit member to the exterior thereof lengthwise along said shaft, said stuffing box comprising a tubular-like member defining a passageway open at both ends thereof with one end disposed interiorly of the conduit member and the other end disposed exteriorly of the conduit member, said shaft being rotatably disposed in said passageway and adapted upon rotation to cause actuation of said emergency valve to open the latter, said shaft having spaced bearing portions thereon adapted for rotative engagement with said passageway, groove means disposed generally adjacent at least certain of said bearing portions and receiving sealing means therein for sealing the shaft with respect to the interior of said tubular-like member, to prevent leakage of liquid lengthwise of said shaft, the exterior end of said stuffing box having releasable, non-threaded detent means for locating said shaft relative to said tubular-like member lengthwise thereof, the corresponding end of said shaft outwardly of said detent means having means for providing for rotation of said shaft, said detent means comprising a circumferential groove in said passageway of said tubular-like member and a generally confronting groove in said shaft with a resilient O-ring disposed in said confronting grooves and releasably locking the shaft in lengthwise position relative to said tubular-like member while permitting rotation of said shaft, said tubular-like member including a circumferential inwardly convergent entry surface to said passageway on the exterior end of said tubular-like member for facilitating insertion and removal of said O-ring into and from coaction with said confronting grooves upon assembly or disassembly of said stuffing box, and wherein said entry surface converges into a generally longitudinally extending circumferential surface section which is spaced radially slightly greater from the lengthwise axis of said passageway as compared to the remainder of the defining surface of said passageway, said surface section being disposed adjacent said confronting grooves axially outwardly thereof in the direction of said exterior end of said tubular-like member.

2. The combination in accordance with claim 1 including passageway means opening onto the exterior end of said shaft communicating with said shaft groove for exhausting air from the last mentioned groove upon assembly of said shaft and O-ring into said tubular-like member.

3. The combination in accordance with claim 1 wherein said tubular-like member and said shaft are formed of aluminum.

4. The combination in accordance with claim 1 wherein the last mentioned means on said shaft includes flats adapted for facilitating connection of an actuating lever thereto.

5. The combination in accordance with claim 1 wherein the other end of said shaft includes a cylindrical stub portion adapted to be rotatably mounted in a bearing on the interior of said conduit member.

6. The combination in accordance with claim 1 wherein said shaft includes recess means disposed intermediate said bearing portions adapted for receiving a lubricant for lubricating the rotative movement of said shaft and said sealing means relative to said tubular-like member.

7. A stuffing box adapted for use in a control including a rotatable crank shaft, for an emergency valve having a projecting portion extending downwardly into a conduit member coacting with an outlet port in a tank, with the valve being biased to a normally closed position, wherein liquid discharge from the tank into the conduit member is prevented, said stuffing box being adapted to be mounted on the conduit member and to extend from the interior thereof to the exterior thereof, and comprising a barrel member defining a passageway open at opposite ends thereof, and adapted to receive the crank shaft in rotatable relation therein, the crank shaft having means adjacent one end thereof adapted for connection to a cam for operation of the projecting portion of the emergency valve to cause opening of the same, and having sealing means coacting with the exterior of the shaft and adapted for coaction with the interior of said barrel member for sealing the shaft and barrel member against leakage of liquid lengthwise of said barrel member, and releasable, non-threaded detent means adjacent the exterior end of said barrel member for locating the shaft relative to said barrel member lengthwise thereof, the corresponding end of the shaft outwardly of said detent means including means adapted for connection to an associated actuating lever for causing rotation of the crank shaft relative to said barrel member, said detent means comprising a circumferential groove in said barrel member passageway and a generally confronting groove in the exterior of said shaft with a resilient O-ring disposed in said confronting grooves and releasably locking the shaft in lengthwise position relative to said barrel member while permitting rotation of said shaft, said barrel member including a circumferential inwardly convergent entry surface to said passageway on the exterior end of said barrel member for facilitating insertion and removal of said O-ring into and from coaction with said confronting grooves upon assembly or disassembly of said barrel member and shaft, and wherein said entry surface merges into a generally longitudinally extending circumferential surface section which is spaced radially slightly greater from the lengthwise axis of said passageway as compared to the remainder of the defining surface of said passageway, said surface section being disposed adjacent said confronting grooves axially outwardly thereof in the direction of said exterior end of said barrel member.

8. A stuffing box in accordance with claim 7 wherein the shaft includes axially spaced bearing portions for rotatably supporting the shaft in said passageway, and means on the shaft disposed intermediate said bearing portions adapted for receiving a lubricant for lubricating rotative movement of the sahft relative to said barrel member.

9. A stuffing box in accordance with claim 7 including a passageway means in said shaft opening to the exterior end thereof, adapted for exhausting air from said O-ring groove in said shaft.

10. A stuffing box in accordance with claim 9 wherein said shaft and said barrel member are formed of aluminum.

* * * * *